United States Patent
Huang et al.

(10) Patent No.: US 8,193,791 B2
(45) Date of Patent: Jun. 5, 2012

(54) MAXIMUM OUTPUT POWER CONTROL OF A FLYBACK CONVERTER

(75) Inventors: Pei-Lun Huang, Zhubei (TW); Kuang-Ming Chang, Zhongli (TW)

(73) Assignee: Richtek Technology Corp., Hsinchu (TW)

( * ) Notice: Subject to any disclaimer, the term of this patent is extended or adjusted under 35 U.S.C. 154(b) by 227 days.

(21) Appl. No.: 12/457,129

(22) Filed: Jun. 2, 2009

(65) Prior Publication Data

US 2009/0303756 A1  Dec. 10, 2009

(30) Foreign Application Priority Data

Jun. 6, 2008 (TW) .............................. 97121158 A

(51) Int. Cl.
*G05F 1/40* (2006.01)
*H02M 3/335* (2006.01)
(52) U.S. Cl. ...... 323/282; 323/287; 323/908; 363/21.12
(58) Field of Classification Search .... 363/21.12–21.18; 323/282–285, 908, 286, 287
See application file for complete search history.

(56) References Cited

U.S. PATENT DOCUMENTS

| | | | |
|---|---|---|---|
| 6,674,656 B1 * | 1/2004 | Yang et al. | 363/21.1 |
| 6,841,979 B2 * | 1/2005 | Berson et al. | 323/282 |
| 6,992,452 B1 * | 1/2006 | Sachs et al. | 318/434 |
| 7,502,235 B2 * | 3/2009 | Huang et al. | 363/21.01 |
| 7,551,464 B2 * | 6/2009 | Chen | 363/97 |
| 7,646,184 B2 * | 1/2010 | Balakrishnan et al. | 323/282 |
| 7,697,308 B2 * | 4/2010 | Huynh et al. | 363/21.16 |

* cited by examiner

*Primary Examiner* — Jessica Han
(74) *Attorney, Agent, or Firm* — Muncy, Geissler, Olds & Lowe, PLLC

(57) ABSTRACT

A method and apparatus for a flyback converter estimate the next value of the current limit for the flyback converter according to a present current limit value to achieve the maximum output power control of the flyback converter. An arithmetic circuit is used to calculate the next current limit value according three parameters, the present current limit value, the value of the current sense signal taken after a first time period counting from the instant when the present duty is triggered, and the variation of the current sense signal during a second time period, thereby narrowing the tolerance of the output power from the flyback converter.

3 Claims, 5 Drawing Sheets

MAXIMUM OUTPUT POWER CONTROL OF A FLYBACK CONVERTER

FIELD OF THE INVENTION

The present invention is related generally to a flyback converter and, more particularity, to a maximum output power control of a flyback converter.

BACKGROUND OF THE INVENTION

A flyback converter is a buck-boost converter having a two-winding inductor for isolation and non-inverted output, in which the storage and conversion of energy are realized by charging and discharging the magnetizing inductor. Generally, for achieving optimal efficiency, a universal-input flyback converter operates in a continuous conduction mode (CCM) during low line voltage and operates in a discontinuous conduction mode (DCM) during high line voltage. However, propagation delay in the flyback converter causes the maximum output power of the flyback converter to vary with the line voltage. The propagation delay is an accumulative result produced along the path through a current limit comparator, a pulse width modulation (PWM) logic circuit, a gate driver and a power MOSFET. FIG. 1 is a waveform diagram of the inductor current in a flyback converter within a switching cycle T using a conventional current limit, in which waveforms 10 and 12 represent the inductor currents at a high line voltage and a low line voltage, respectively. Due to the propagation delay Tp, both of the inductor currents still keep rising after they reach the current limit value $V_{CL}$. As the rising slopes of the inductor current waveforms 10 and 12 vary with the line voltage, the differences between the peak currents $I_{pk}$ thereof and the current limit value $V_{CL}$ caused by the propagation delay $T_p$ in the two cases may be significantly different from each other. Assuming that the switching frequency fs is constant, and the efficiency η is constant, the output power will be determined by the energy stored in each cycle as $$P_{omax}=0.5 \cdot f_s \cdot L \cdot (I_{pk}^2 - I_{valley}^2) \cdot \eta, \qquad [\text{Eq-1}]$$

where L is the magnetizing inductance of the primary coil of the transformer, and $I_{pk}$ and $I_{valley}$ are the peak value and the valley value of the inductor current, respectively. As shown in FIG. 1, for a flyback converter controlled under a constant current limit, the output power at a high line voltage is far greater than that at a low line voltage, and in consequence the flyback converter requires a wide-ranged output power tolerance. It is possible that such a flyback converter will require a tolerance range up to 100%, which nevertheless tends to cause problems such as component stress or system error under over-power situation. Since over-power tests are routinely performed for flyback converter products, system designers often have to make great efforts for tradeoff between the aforesaid factors and market demands.

Due to the use of primary-side control, most of PWM controllers have trouble with output over-power control over a wide range of line voltages. Thus, it has been a common goal for PWM controllers to narrow the tolerance of output over power.

U.S. Pat. No. 6,674,656 disclosed a PWM controller which provides a time-dependent current limit $V_{CL}(t)$ that varies along a built-in sawtooth waveform, as shown in FIG. 2, to tighten the output power tolerance, as shown in FIG. 3. Although simple and direct, this control approach has the following defects.

First, while being one-size-fits-all, this control approach has its built-in sawtooth waveform determined according to the system parameters of the most common flyback converter products. In order to obtain better output power convergence, the parameters may be finely tuned to match the built-in waveform. However, some of the parameters, such as efficiency, EMI and thermal factors, must be compromised and thus affect primary inductance, current sense resistance, and gate driver resistance. Consequently, the output power often deviates from the original design so that system designers will have to spend more time, or additional elements be required, to deal with the deviation. Besides, it is frequently found in practice that some controllers lead to better system output convergence than others.

An even more serious problem related to the conventional control approach is that, for simplifying the circuit configuration, the current limit $V_{CL}(t)$ has a sawtooth waveform, i.e., a waveform having a single slope. When a system requires a relatively large primary inductance whose current slope is smaller or slightly greater than the slope of the current limit at low line voltage, the waveform of the current sense signal may never reach the waveform of the current limit $V_{CL}(t)$ until the maximum cycle is reached. In this case, the output voltage is out of regulation, and the function of output power limit is lost.

At last, owing to the time-dependent waveform in each cycle, it is difficult to establish a fast test for mass production, and in consequence the waveform tolerance in the datasheet is hard to define. Nevertheless, the waveform tolerance is a key factor in forecasting the tolerance of output power.

SUMMARY OF THE INVENTION

In view of the aforementioned defects, the present invention provides a maximum output power control method for a flyback converter, which primarily involves estimating a next value of the current limit for the flyback converter according to a present current limit value.

The present invention also provides a maximum output power control apparatus for a flyback converter, which comprises an arithmetic circuit to calculates a next value of the current limit for the flyback converter according to a present current limit value, the value of the current sense signal after the duty is triggered for a first time period, and the variation of the current sense signal during a second time period.

The control method and apparatus according to the present invention estimate the next current limit value based on the present current limit value to narrow the tolerance of output power from the flyback converter.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
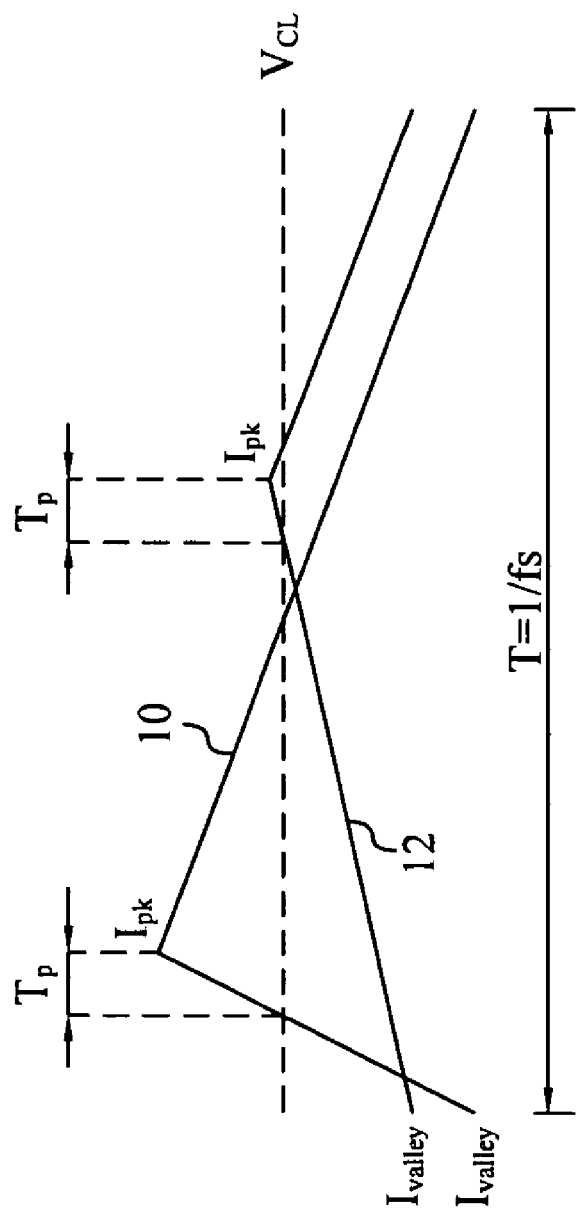
FIG. 1 is a waveform diagram of the inductor current in a conventional flyback converter.
Figure 2:
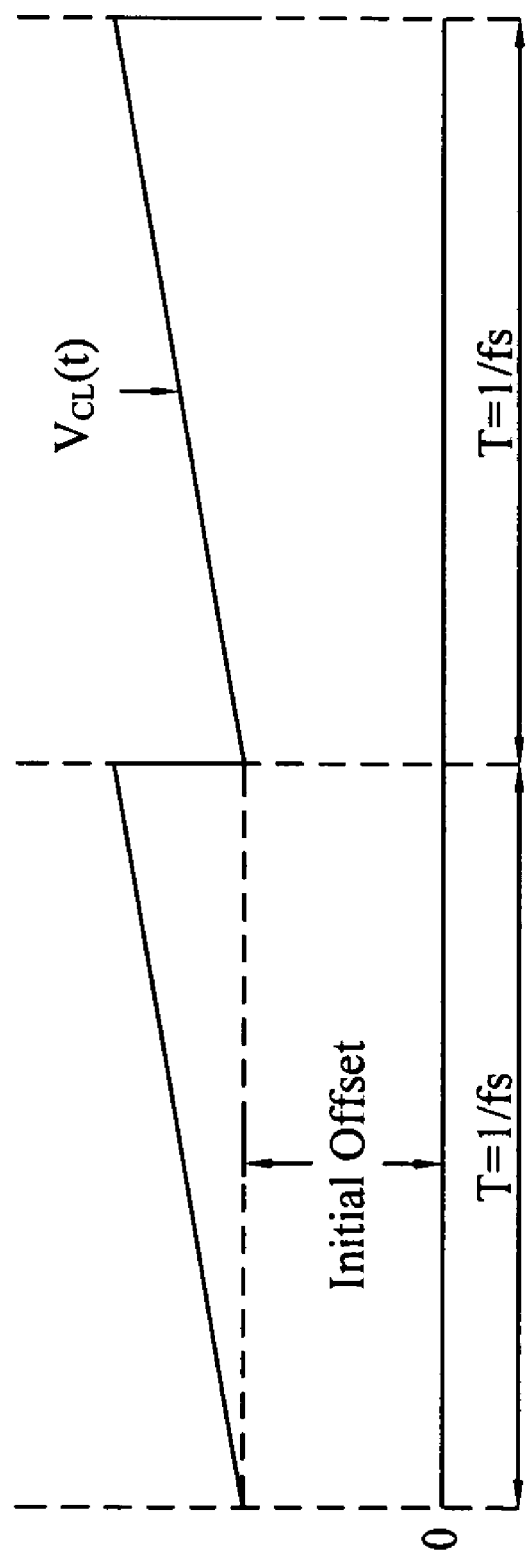
FIG. 2 is a waveform diagram of a conventional sawtooth wave-based current limit.
Figure 3:
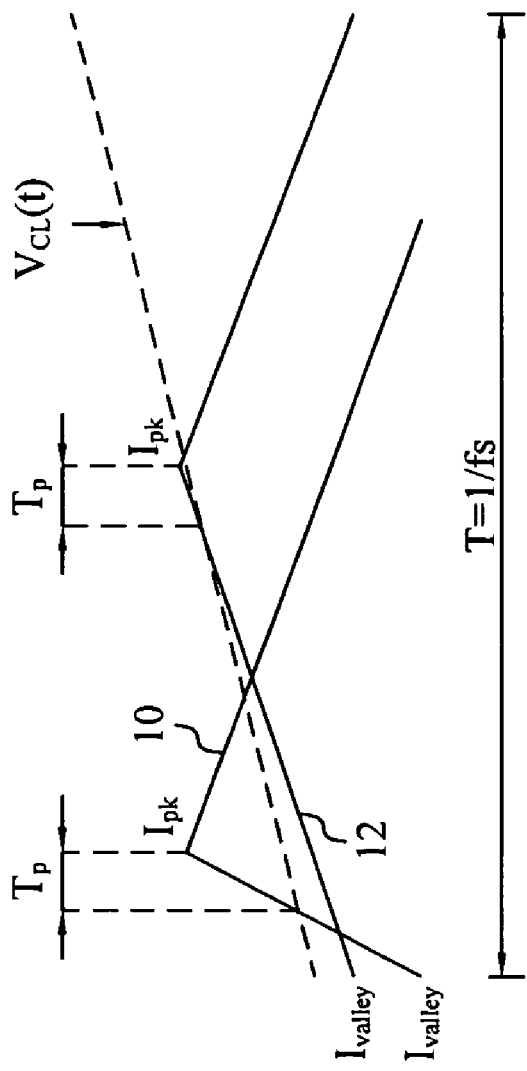
FIG. 3 is a waveform diagram of the inductor current in a flyback converter using the sawtooth wave-based current limit of FIG. 2.
Figure 4:
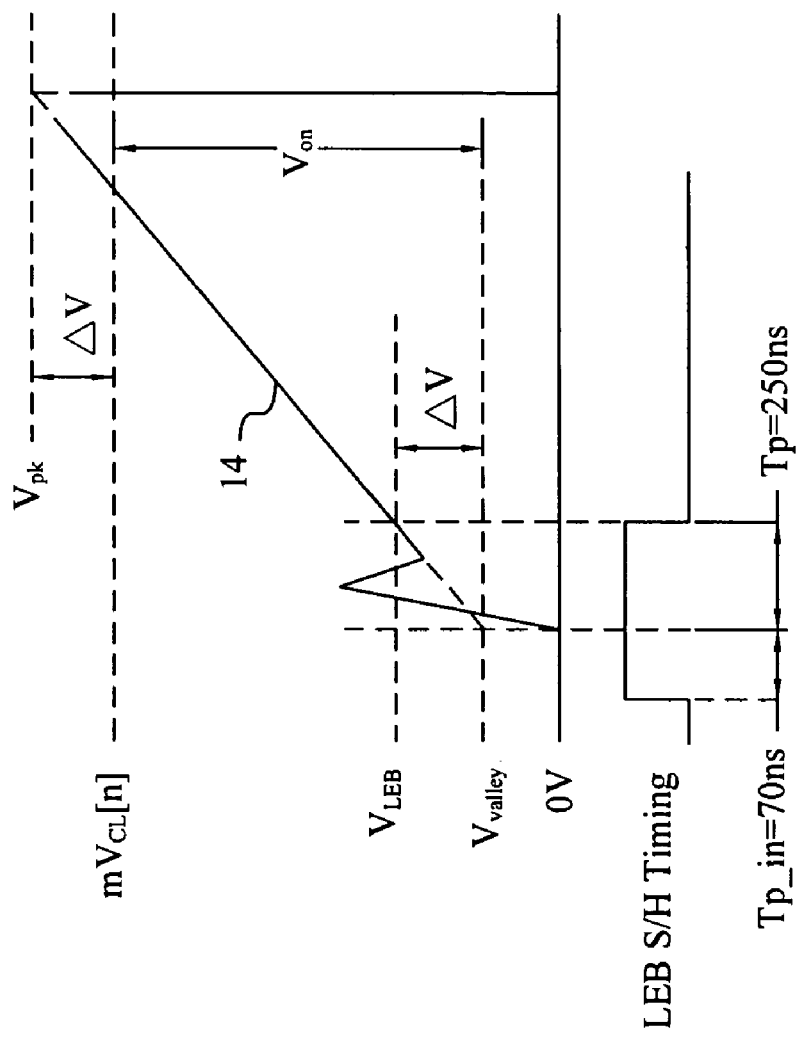
FIG. 4 is a waveform diagram showing a method according to the present invention.

FIG. 4 depicts a current sense signal 14 which is amplified m-fold and serves to represent an inductor current that stores energy as the expected maximum output power $$P_{omax} = \frac{\eta \cdot L \cdot f_s}{2}\left[\left(\frac{V_{pk}}{m \cdot R_{cs}}\right)^2 - \left(\frac{V_{valley}}{m \cdot R_{cs}}\right)^2\right], \quad [\text{Eq-2}]$$

where $V_{pk}$ and $V_{valley}$ are the peak value and the valley value of the current sense signal 14, respectively, and Rcs is the current sense resistance. In this embodiment, the actual current sense signal is amplified m-fold to facilitate sampling and holding while better noise immunity is obtained. After calculation, a current limit against which the current sense signal 14 is compared is derived from a universal constant power. Thus, a resultant controller has simplified internal operation while being externally similar to the conventional controllers.

The equation Eq-2 can be revised into $$P_{omax} = \frac{\eta \cdot f_s \cdot L}{2m^2 \cdot R_{cs}^2} \cdot (V_{pk} - V_{valley}) \cdot (V_{pk} + V_{valley}). \quad [\text{Eq-3}]$$

Referring to FIG. 4, $$V_{pk} = m \cdot V_{CL} + \Delta V, \quad [\text{Eq-4}]$$

$$V_{valley} = m \cdot V_{CL} - V_{on}, \quad [\text{Eq-5}]$$

$$\Delta V = \frac{V_i \cdot T_P \cdot R_{cs} \cdot m}{L}, \quad [\text{Eq-6}]$$

where $\Delta V$ represents the variation of the current sense signal 14 during a propagation delay Tp, Von is the difference between $V_{valley}$ and $mV_{CL}$, and $V_i$ denotes the input voltage of the flyback converter.

Tp is a predetermined propagation delay that may vary from printed circuit board (PCB) to PCB. Although the propagation delays of different circuits are estimable, such estimation will complicate the system significantly. Thus, the present invention adopts the generally acknowledged Tp value in the art, namely 250 ns.

By substituting $V_{pk}$ and $V_{valley}$ in the equations Eq-4 and Eq-5 into the equation Eq-3, it obtains $$V_{CL} = \frac{K}{V_{on} + \Delta V} + \frac{V_{on} - \Delta V}{2m}, \quad [\text{Eq-7}]$$

where $$K = \frac{m \cdot R_{cs}^2 \cdot P_{omax}}{\eta \cdot f_s \cdot L}. \quad [\text{Eq-8}]$$

K is a predetermined value and is regarded as a constant herein. $V_{on}$ and $\Delta V$ are variables in the equation Eq-7. Theoretically, $V_{on}$ can be determined by detecting $V_{pk}$. However, since the storing path of a Miller capacitor includes a resistor $R_{cs}$, it is impossible to derive $V_{pk}$ from the current sense signal 14 of FIG. 4. Therefore, in the switching cycle, $V_{CL}$ is used as a substitute so that $V_{on}$ is expressed as $$V_{on} = m \cdot V_{CL}[n] - V_{valley}. \quad [\text{Eq-9}]$$

As shown in FIG. 4, a transient current surge occurs when the current sense signal 14 rises, and in consequence $V_{valley}$ cannot be directly obtained from the current sense signal 14. Hence, the following equation is provided to determine $$V_{valley} = V_{LEB} - \Delta V, \quad [\text{Eq-10}]$$

where $V_{LEB}$ is the value of the current sense signal 14 taken after Tp counting from the instant when the duty is triggered. Since $V_{LEB}$ is designed to eliminate one $\Delta V$, $V_{LEB}$ has a width equal to the sum of an internal logic delay $T_{P\_in}$ (70 ns) and the propagation delay $T_p$ (250 ns).

By substituting $V_{valley}$ of the equation Eq-10 into the equation. Eq-9, it obtains $$V_{on} = m \cdot V_{CL}[n] - V_{LEB} + \Delta V. \quad [\text{Eq-11}]$$

Now, all the required signals can be determined by detection. Thus, the equation Eq-7 can be revised into $$V_{CL}[n+1] = \frac{K}{m \cdot V_{CL}[n] - V_{LEB} + 2 \cdot \Delta V} + \frac{m \cdot V_{CL}[n] - V_{LEB}}{2m}. \quad [\text{Eq-12}]$$

The physical meaning of the equation Eq-12 is that the value $V_{CL}[n+1]$ of the current limit in the next cycle is estimated according to the value $V_{CL}[n]$ of the current limit in the present cycle. The value $V_{CL}[n+1]$ of the current limit in the next cycle serves to limit the output power so that the output power is no higher than Pomax. When the load reaches Pomax, $$V_{CL}[n+1] = V_{CL}[n], \quad [\text{Eq-13}]$$

and then the output voltage begins to decrease.

Figure 5:
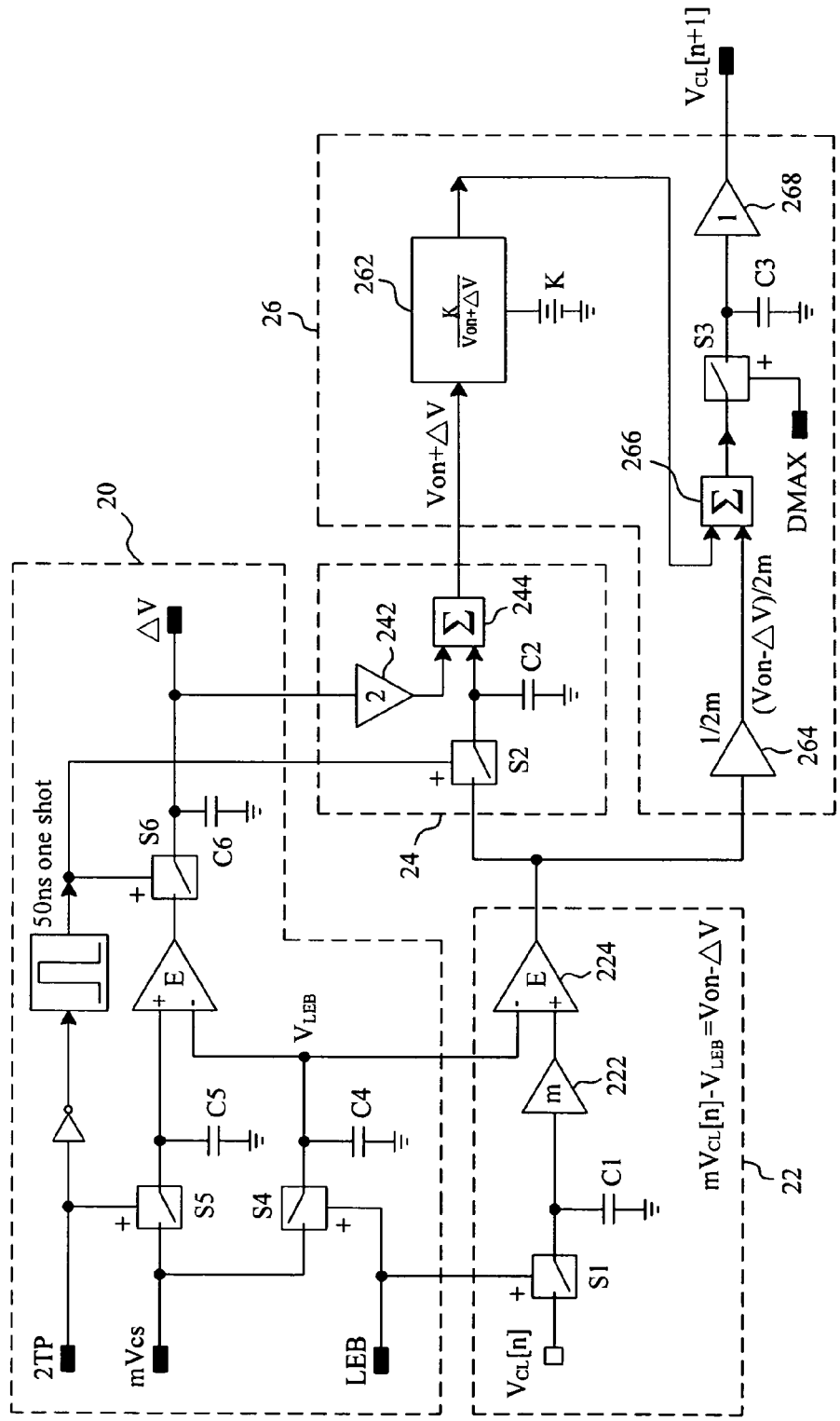
FIG. 5 is a circuit diagram of a control apparatus according to the present invention.

FIG. 5 is a circuit diagram of an embodiment to realize the equation Eq-12, in which a $\Delta V$ sensing circuit 20 at the upper left portion of the drawing is extracted from another application of the present assignee and is not included in the present invention. The $\Delta V$ sensing circuit 20 serves to provide certain parameters to an arithmetic circuit of the present invention. More particularly, the $\Delta V$ sensing circuit 20 provides the arithmetic circuit of the present invention with the current sense signal $V_{LEB}$ taken after a first time period LEB counting from the instant when the present duty is trigged and the variation $\Delta V$ of the current sense signal during $T_p$, so that the arithmetic circuit can determine the current limit value $V_{CL}[n+1]$ of the current limit for the next cycle. The signal LEB is a leading-edge blanking signal in a conventional flyback converter. In another embodiment, however, the signal LEB can be replaced by another signal, and yet the $\Delta V$ sensing circuit 20 has to be modified accordingly. The arithmetic circuit of the present invention comprises three portions, the first portion 22 serves to generate $V_{on} - \Delta V$, the second portion 24 serves to generate $V_{on} + \Delta V$, and the third portion 26 serves to generate the next current limit value $V_{CL}[n+1]$ according to outputs of the first portion 22 and the second portion 24. In the first portion 22, a sampling and holding (S/H) circuit includes a switch S1 and a capacitor C1 under control of the signal LEB to sample and hold the present current limit value $V_{CL}[n]$, an amplifier 222 amplifies $V_{CL}[n]$ m-fold, and a subtracter 224 subtracts $V_{LEB}$ from the amplified $V_{CL}[n]$ to generate $V_{on} - \Delta V$. In the second portion 24, a sampling and holding circuit includes a switch S2 and a capacitor C2 under control of a one-shot signal to sample and hold the output of the first portion 22, an amplifier 242 amplifies $\Delta V$ two-fold, and an adder 244 adds $V_{on} - \Delta V$ to the amplified $\Delta V$ to generate $V_{on} + \Delta V$. In the third portion 26, a functional block 262 takes the multiplicative inverse of $V_{on}+\Delta V$ and amplifies the inverse of $V_{on}+\Delta V$ K-fold, where K is set externally. On the other hand, $V_{on}-\Delta V$ is divided by 2m by an amplifier 264 and then added to the output of the functional block 262 by an adder 266, thus completing the operation of the equation Eq-12. The output of the adder 266 is sampled and held by a sampling and holding circuit which includes a switch S3 and a capacitor C3, before $V_{CL}[n+1]$ is outputted by a unity-gain amplifier 268. Since the circuit shown in FIG. 5 comprises nothing more than basic circuit units, it can be easily reproduced by those persons skilled in the art. Besides, one skill in the art can design different arithmetic circuits based on the equation Eq-12 to obtain the same current limit value $V_{CL}[n+1]$.

In a practical application, the circuit shown in FIG. 5 is used in a flyback converter having a maximum duty of 75%, whose all the calculation is finished in the first 75%-period of a switching cycle, and the calculated current limit value $V_{CL}[n+1]$ is shifted, under the control of a signal DMAX, during the successive 25%-period of the switching cycle to be used in the next switching cycle.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A maximum output power control method for a flyback converter which compares a current sense signal representative of a current in a power switch with a dynamically adjustable current limit to determine a duty for the power switch, comprising:
    providing a present current limit value; and
    estimating a next current limit value according to the current sense signal and the present current limit value,
        wherein the step of estimating a next current limit value according to the current sense signal and the present current limit value comprises:
            providing the value of the current sense signal after the duty is triggered for a first time period as a first parameter;
            providing a variation of the current sense signal during a second time period as a second parameter;
            calculating with the present current limit value and the first and second parameters to obtain a difference between the present current limit value and the first parameter; and
            calculating with the difference and the second parameter to determine the next current limit value.

2. A maximum output power control apparatus for a flyback converter which compares a current sense signal representative of a current in a power switch with a dynamically adjustable current limit to determine a duty for the power switch, comprising:
    a first input terminal receiving a present current limit value;
    a second input terminal receiving the value of the current sense signal taken after the duty is triggered for a first time period;
    a third input terminal receiving a variation of the current sense signal during a second time period; and
    an arithmetic circuit connected to the first, second and third input terminals to calculate a next current limit value according to the parameters provided by the first, second and third input terminals.

3. The maximum output power control apparatus of claim 2, wherein the arithmetic circuit comprises:
    a first portion connected to the first and second input terminals to determine a difference between the parameters provided by the first and second input terminals;
    a second portion connected to the first portion and the third input terminal to determine a sum of the difference and a two-fold of the variation; and
    a third portion connected to the first and second portions to determine the next current limit value according to the difference and the sum.

* * * * *